United States Patent [19]
Takahashi et al.

[11] Patent Number: 5,322,716
[45] Date of Patent: Jun. 21, 1994

[54] METHOD FOR PRODUCING MAGNETIC RECORDING MEDIUM

[75] Inventors: Kiyoshi Takahashi, Ibaraki; Mikio Murai, Hirakata; Masaru Odagiri, Kawanishi, all of Japan

[73] Assignee: Matsushita Electric Industrial Co., Ltd., Osaka, Japan

[21] Appl. No.: 987,988

[22] Filed: Dec. 9, 1992

Related U.S. Application Data

[63] Continuation of Ser. No. 797,142, Nov. 25, 1991, abandoned, which is a continuation of Ser. No. 521,987, May 11, 1990, abandoned.

[30] Foreign Application Priority Data

Jul. 4, 1989 [JP] Japan .................. 1-172220

[51] Int. Cl.$^5$ ............................................. H01F 10/02
[52] U.S. Cl. .................................. 427/535; 427/129; 427/131; 427/132; 427/172; 427/296; 427/470; 427/536; 427/537; 427/549; 427/557; 427/573; 427/585; 427/599
[58] Field of Search ............... 427/535, 536, 537, 549, 427/557, 573, 585, 599, 129, 131, 132, 172, 470, 296

[56] References Cited

U.S. PATENT DOCUMENTS

| | | | |
|---|---|---|---|
| 4,585,537 | 4/1986 | Nakayama et al. | 427/38 X |
| 4,833,031 | 5/1989 | Kurokawa et al. | 427/131 X |
| 4,835,070 | 5/1989 | Kurokawa | 427/131 X |
| 5,013,583 | 5/1991 | Yamamura et al. | 427/131 |

Primary Examiner—Bernard Pianalto
Attorney, Agent, or Firm—Stevens, Davis, Miller & Mosher

[57] ABSTRACT

A method of producing a magnetic recording medium comprises the steps of heating in vacuum a magnetic recording medium produced by forming a ferromagnetic metal-film-type recording medium onto a non-magnetic substrate and of forming, immediately after heating, a protective layer on the magnetic recording medium by a plasma CVD method. A production apparatus for carrying out this method comprises a feeding apparatus for feeding a magnetic recording medium with a ferromagnetic thin film formed on a non-magnetic substrate, a plasma CVD apparatus, disposed in the path of this feeding apparatus, for forming a protective layer, and a heating apparatus disposed just before this plasma CVD apparatus in the feeding path.

12 Claims, 4 Drawing Sheets

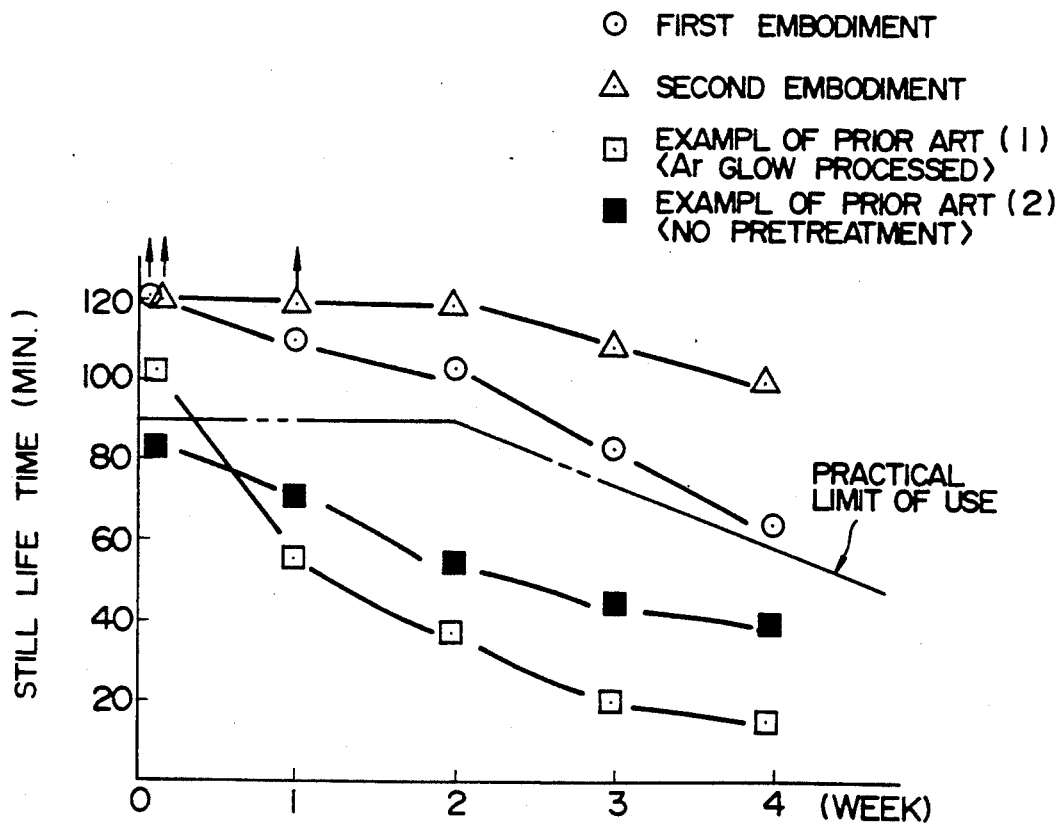

METHOD FOR PRODUCING MAGNETIC RECORDING MEDIUM

This application is a continuation of application Ser. No. 07/797,142, filed Nov. 25, 1991 (abandoned) which is a continuation of application Ser. No. 07/521,987, filed May 11, 1990 (abandoned).

BACKGROUND OF THE INVENTION

1. Field of the Invention

The present invention relates to a ferromagnetic metal-film-type recording medium and, more particularly, to a method and apparatus for producing a magnetic recording medium of the type mentioned above, wherein durability of a protective layer which is formed after the formation of a magnetic layer so as to improve the performance thereof in practical use, is remarkably improved, as well as to an apparatus suitable for use in carrying out the method.

2. Description of the Related Art

Ferromagnetic metal-film-type recording media have been known which are produced by forming, through vacuum deposition, sputtering, or ion plating or a like method conducted in a vacuum atmosphere, a film of Co, Ni, Fe, or alloys thereof on a polymeric film such as a polymide film or on a substrate which is made of a non-magnetic metal. In these ferromagnetic metal-film-type magnetic recording media, it is possible to remarkably improve recording density as compared with a conventional application type magnetic recording medium. In order to attain a high recording density, it is an important factor to diminish as much as possible any recording/reproduction detects, as well as to minimize spacing losses due to spacing between a magnetic head and a magnetic recording medium. A magnetic recording medium must also have high durability. In order to meet these requirements, hitherto, it has been known to cover a material layer with a protective layer, and, further to form a lubrication layer. A method is also known in which surface contamination is removed by an argon glow discharge process just before a protective layer is formed. FIG. 5 shows a magnetic recording medium in which a protective layer is formed by a conventional plasma CVD (Chemical Vapor Deposition) method, and a lubrication layer is formed by a wet-application method. Numeral 1 denotes a substrate, 2 denotes a ferromagnetic metal-film-type layer formed by a vacuum deposition method, 3 denotes a back coating layer, 4 denotes a protective layer formed by a plasma CVD method, and 5 denotes a lubrication layer formed by a wet-application method. FIG. 6 shows an example of a method of producing a magnetic recording medium so as to form a protective film (a diamond like carbon film) by a plasma CVD method after an argon glow process is performed for cleaning as disclosed in U.S. Pat. No. 4,833,031. An example of the above-mentioned method and apparatus for producing magnetic recording media will be explained hereinunder with reference to FIGS. 5 and 6. First, a description will be given, with reference to FIG. 6, to an apparatus for forming a protective layer 4 by a plasma CVD method after a conventional argon glow process is performed. Numeral 10a denotes a magnetic recording medium before the formation of a protective layer, which is wound on a supply roller 11. Numerals 12 and 14 denote pass rollers, which rotate in contact with the ferromagnetic thin-film layer 2 on the magnetic recording medium 10. Numeral 13 denotes a main roller which is insulated from the main part of the apparatus and which is capable of feeding the magnetic recording medium 10 in close contact with the ferromagnetic metallic film layer 2 with a predetermined voltage applied therebetween. Numeral 15 denotes a take-up roller, which continuously takes up the magnetic recording medium 10b after formation of a protective layer. Numeral 16 denotes a nozzle for an argon glow-discharge process, 17 denotes an electrode, 18 denotes an argon gas introduction port, 19 denotes a power supply for a glow discharge process. These components 10 to 19 in cooperation constitute an argon glow discharge process unit. Numeral 20 denotes a nozzle for plasma CVD, 21 denotes an electrode, 22 denotes a gas introduction port, 23 denotes a plasma-generating power supply. These components in cooperation constitute a plasma CVD processing unit for forming protective layers. Numeral 24 denotes a bias power supply, which applies a voltage between the main roller 13 and the ferromagnetic thin-film layer 2 of the magnetic recording medium 10. This power supply is disposed outside a vacuum container together with the power supply 19 for glow discharge processing and the plasma-generating power supply 23. Next, a will be described of producing a magnetic recording medium by a conventional CVD method which employs an apparatus constructed as mentioned above. The magnetic recording medium 10a, in the condition before the formation of the protective layer 4 is unwound from the supply roller 11 and is advanced through the bus roller 12. The magnetic recording medium 10a is further continuously fed in close contact with the main roller 13 with a voltage applied between itself and the main roller 13. On the other hand, an argon glow discharge is generated from the nozzle 16 as the result of a supply of argon gas from the argon gas introduction port 18 before the formation of a protective layer. The glow is produced by the electrode 17 for argon glow discharge and the power supply 19. Foreign matter on the surface magnetic layer of the magnetic recording medium 10a is removed. Immediately after this, a plasma ion current is generated as the result of the supply of reactive gas flowing in from the gas introduction port 22 and of a voltage applied from the plasma-generating electrode 21 and the plasma-generating power supply 23, and this current is fed to the plasma nozzle 20. It reaches the ferromagnetic metallic film layer 2 of the magnetic recording medium 10a, and a protective layer 4 is formed. The magnetic recording medium 10b with the protective layer 4 formed thereon is taken up by the take-up roller 15 through the pass roller 14.

However, in the above-mentioned conventional method, not only is the foreign matter on the magnetic layer surface removed in the argon glow discharge process before the formation of the protective layer, but damage is caused to the surface of the magnetic layer by the argon ion current at glow discharge time. This leads to decreased still durability and resistance to corrosion, resulting in unsuitability for practical use. Further, as disclosed in U.S. Pat. No. 5,013,583, there has been provided a method of forming a $Ca_3O_4$ protective film by a vapor deposition method or sputtering method. However, such methods cannot provide a continuous protective film having a thickness of 100 Angstroms so as to improve a corrosion resistance thereof. The vapor deposition method cannot provide an adequate adhesion strength. The sputtering method causes the magnetic layer to be damaged by ionizing the sputter gas, and the protective film includes metallic atoms. As a result, still durability of a video tape recorder is deteriorated by solidification of metal (contained in the protective layer of the tape) on the head of the recorder.

SUMMARY OF THE INVENTION

The present invention has been devised in light of the above-mentioned problems. Accordingly, it is an object of the present invention to provide a method and an apparatus for producing magnetic recording media, in which still durability and resistance to corrosion are remarkably improved in practical use in a video tape recorder by removing the foreign matter under mild conditions before the formation of the protective layer and by driving off gas with a heat source to make the effect in use of the protective layer best by the plasma CVD method.

In order to solve the above-mentioned problems, the method of producing magnetic recording media of the present invention comprises the steps of (1) causing a magnetic recording medium with a ferromagnetic metallic film layer formed on a non-magnetic substrate in a vacuum to run in a predetermined direction, (2) heating the magnetic recording medium with a heat source, and (3) forming a protective layer by the plasma CVD method immediately thereafter. The production apparatus for producing magnetic recording media of the present invention comprises a feeding means for feeding a magnetic recording medium with a ferromagnetic metallic film layer formed on a non-magnetic substrate in a predetermined direction, a heating apparatus for removing foreign matter from the magnetic recording metallic film layer in this feeding path and a plasma CVD apparatus immediately after the heating apparatus in the feeding path.

According to the present invention, the surface of a ferromagnetic metallic film layer of the magnetic recording medium is heated to drive off gas, and immediately after this, a protective layer is formed by the plasma CVD method. As a result, foreign matter on the ferromagnetic metallic film layer of the magnetic recording medium is removed, and a protective layer is formed. Therefore, the protective layer is strongly bonded to the surface of the ferromagnetic metallic film layer. In consequence, still durability and resistance to corrosion are remarkably improved.

These and other objects, features and advantages of the present invention will become clear from the following description of the preferred embodiments of the present invention, together with reference to the accompanying drawings.

BRIEF DESCRIPTION OF THE DRAWINGS

FIG. 3 is a view that allows comparison of the still life of a magnetic recording medium produced by the methods in the first and second embodiments with that of a magnetic recording medium produced by the conventional method;

FIG. 4 is a view that allows comparison of the resistance to corrosion of different magnetic recording mediums similarly produced as in FIG. 3;

DETAILED DESCRIPTION OF THE PREFERRED EMBODIMENTS

Figure 1:
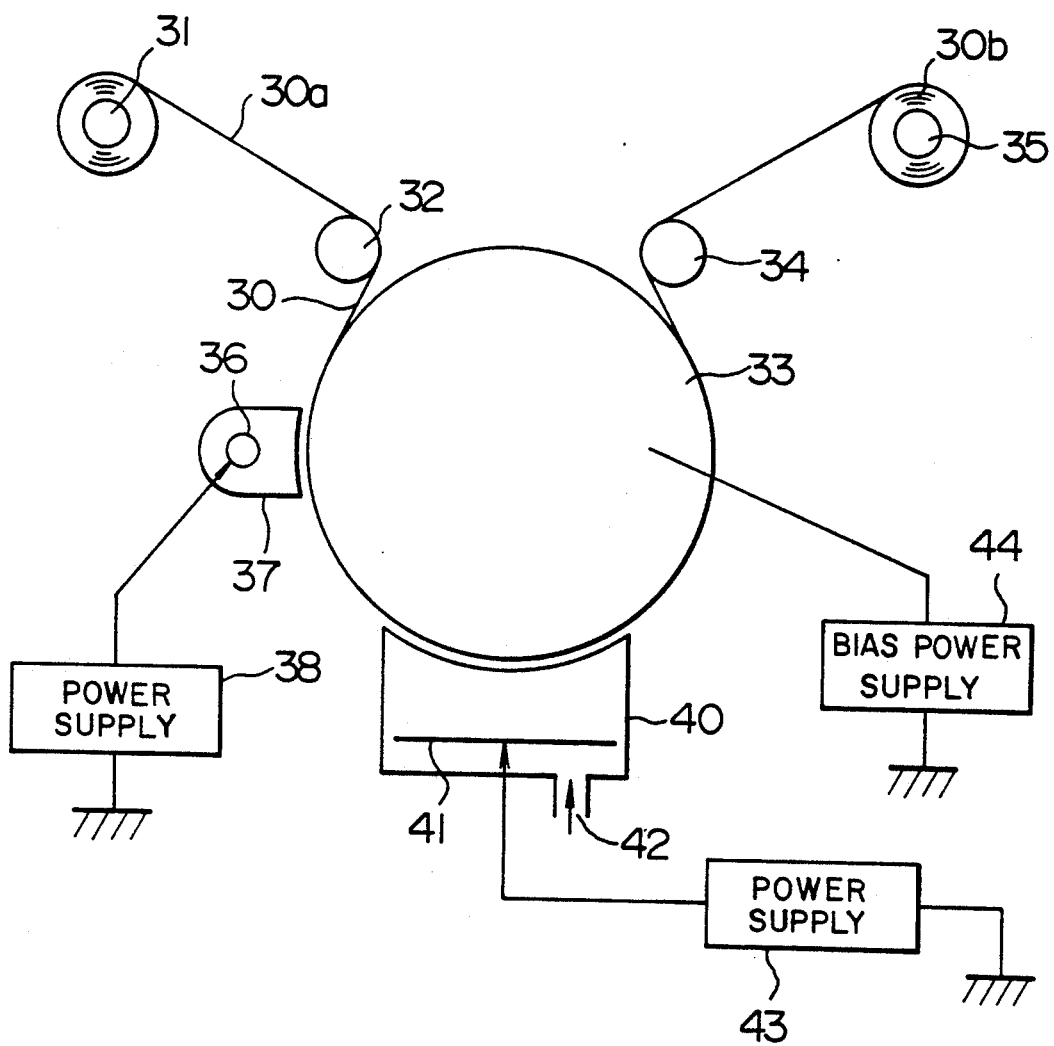
FIG. 1 is a schematic illustration of a production apparatus where a halogen lamp is used in the method for driving off gas, and an infrared heater is used as a heat source in the first embodiment of the present invention.
Figure 5:
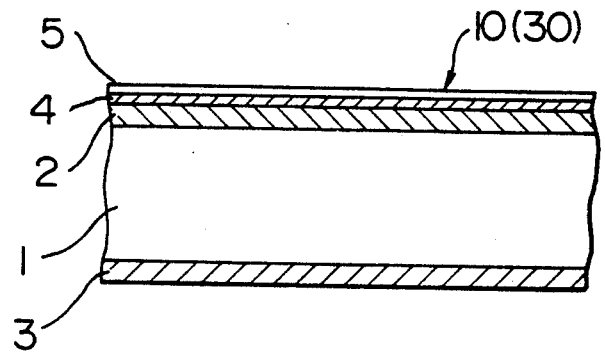
FIG. 5 is a cross section illustrating the basic structure of a magnetic recording medium.
Figure 6:
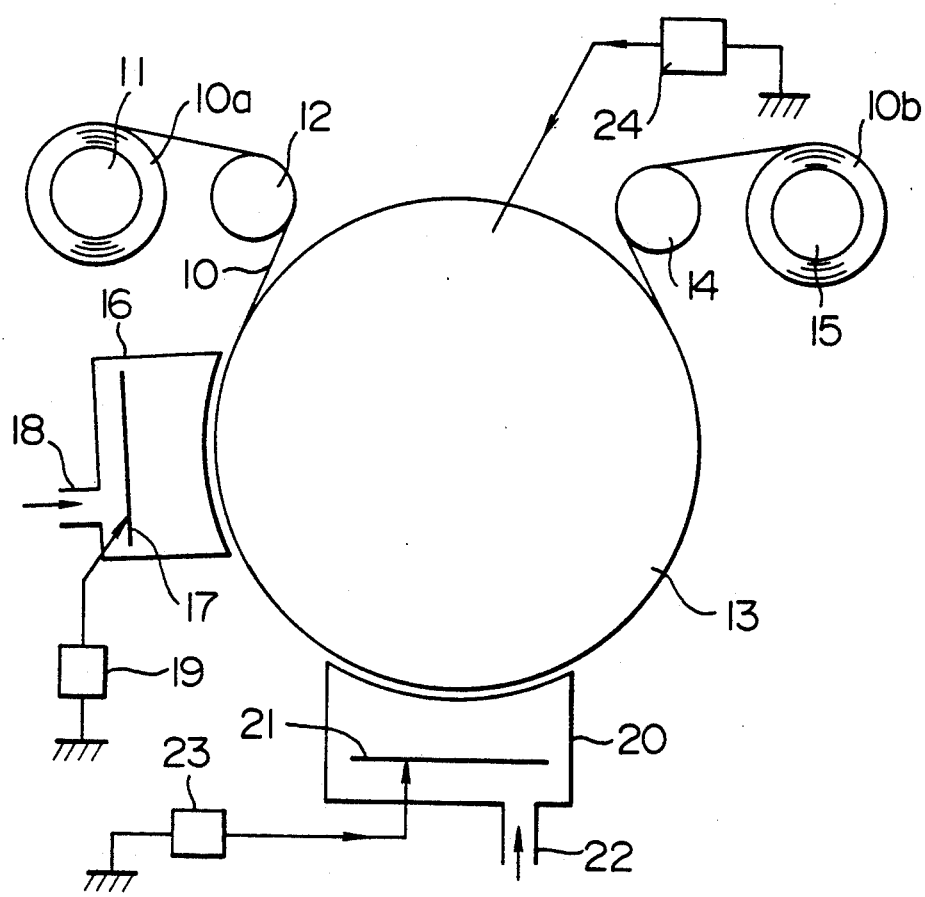
FIG. 6 is a schematic illustration of a production apparatus for producing magnetic recording mediums by the conventional method.

The embodiments of the present invention will be explained below with reference to the accompanying drawings. FIG. 1 schematically shows the configuration of an apparatus in the first embodiment of the present invention. The basic structure of the magnetic recording medium 30 produced in this embodiment is the same as that of the prior art shown in FIG. 5. With a PET film of 3 to 20 $\mu$m thick as a substrate 1, a ferromagnetic metallic film layer 2 of a Co-Ni alloy having a thickness or 0.1 to 0.2 $\mu$m is formed on the front side of the substrate 1 by oblique evaporation deposition. To improve running characteristics, the magnetic recording medium 30 is a magnetic recording medium having the back coating layer 3 made of a mixture of resin and carbon and further has a protective layer 4 formed on the ferromagnetic metallic film layer 2, and a lubrication layer 5 formed on the protective layer 4. In FIG. 1, numeral 30a denotes a magnetic recording medium before the formation of the protective layer 4, which is wound on the supply roller 31 and which is supplied from the roller 21 with a tension controlled to 0.5 to 2 kgf per 5.00 mm in terms of width. Numerals 32, 34 are pass rollers, which rotate in close contact with the magnetic recording medium 30. Numeral 33 denotes a main roller, on the surface of which a dielectric film is provided. A voltage of 0.05 to 3 KV DC is applied to the main roller 33 from a bias power supply 44. The main roller is also driven to rotate under such control as to feed the magnetic recording medium 30 at a constant velocity of 0.1 to 200 m/min. Numeral 35 is a take-up roller which continuously takes up the magnetic recording medium in the state after the formation of the protective layer 4. The magnetic recording medium in this state is denoted by 30b. The take-up of the magnetic recording medium 30b by the take-up roller 35 is conducted in such a way that a tension of 0.5 to 20 kgf per 500 mm in terms of width is developed. It is also possible to conduct a control of the tension. Numeral 36 denotes a halogen lamp or an infrared heater connected to a power supply 38, and 37 denotes a reflective plate. The halogen lamp 36, the reflective plate 37 and the electrode 38 in cooperation constitute a heating and gas driving-off processing unit. Numeral 40 denotes a plasma nozzle for forming a protective layer. Numeral 41 denotes an electrode for generating a plasma, which is connected to the plasma-generating power supply 43. This power supply 43 can apply a voltage of 0.05 to 5 KV in terms of effective value, in the form of a DC, AC or a voltage formed by superposing two or more of these different types of voltage. Numeral 42 denotes a gas introduction port through which a reactive gas such as $H_2$, Ar, CH-type or the like, or a gaseous phase of ketone, alcohol or the like is introduced at a partial pressure of 0.5 to 0.001 Torr. The method of and apparatus for producing a magnetic recording medium as constructed above will be explained with reference to FIG. 1. The magnetic recording medium 30a in the state before the formation of a protective layer is supplied from the supply roller 31 and continuously fed towards the take-up roller 35 while being closely contacted at its side opposite to the ferromagnetic metallic film layer 2 by the main roller to which a predetermined voltage is applied from the bias power supply 44. On the other hand, a halogen lamp or an infra-red heater 36 as a heat source is applied with a voltage from the power supply 38 and goes on, forming parallel light beams by a reflective plate 37. The surface of the ferromagnetic metallic film layer 2 of the magnetic recording medium 30a is radiated with the beams, causing its surface temperature to rise. For this reason, foreign matter including water deposited in the atmosphere are discharged to a vacuum atmosphere as gas due to the increase in temperature. The surface of the ferromagnetic metallic film layer 2 is cleaned, and fed to a protective layer formation area. On the other hand, plasma ion current for forming a protective layer is generated as the result of a supply of a reactive gas from the gas introduction port 42 and a voltage applied from the plasma-generating power supply 43. It reaches the ferromagnetic metallic film layer 2 of the magnetic recording medium 30a which opposes the plasma nozzle 40 for forming a protective layer, and the protective layer 4 is formed. At this time, a protective layer is formed on the ferromagnetic metallic film type layer 4 in a state in which the surface of the layer is clean, and thus making it possible to effect a strong chemical bonding on the ferromagnetic metallic film layer 2. As regards the magnetic recording medium 30, still durability and resistance to corrosion are remarkably improved.

Figure 2:
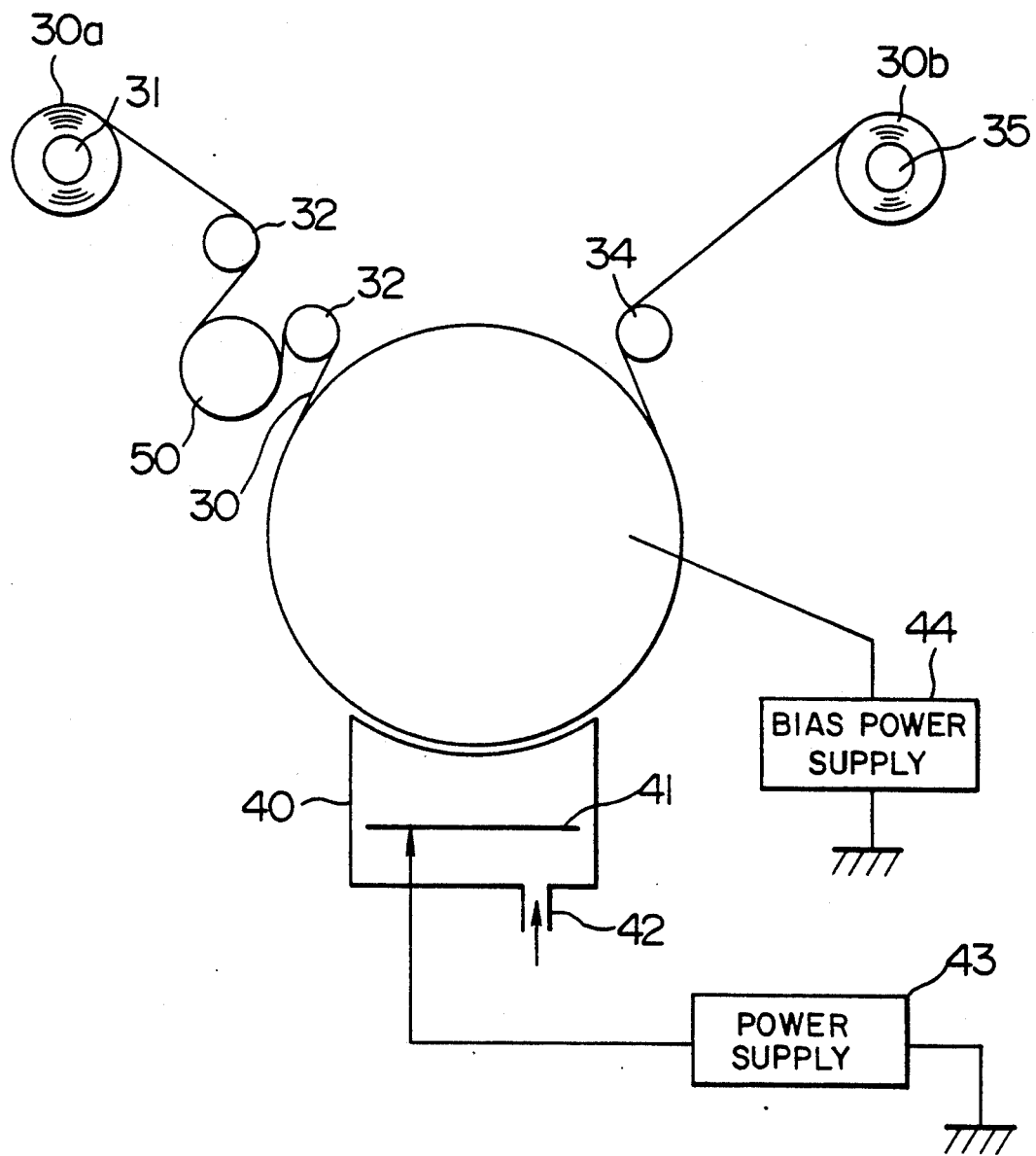
FIG. 2 is a schematic illustration of a production apparatus where a thermal roller is used as the heat source in the second embodiment of the present invention.

Next, the second embodiment of the present invention in which a thermal roller is used for a method of driving off gas just before the formation of the protective layer 4 will be explained with reference to FIG. 2. The production apparatus of this embodiment shown in FIG. 2 differs from that of the first embodiment in that, as a heat source for driving off gas, a thermal roller 50 which rotates in close contact with the back side of the magnetic recording medium 30a is provided in place of the above-mentioned halogen lamp and the infra-red lamp. The other portion of the construction is the same as those of the first embodiment. Therefore, corresponding components are given similar numerals, and a detailed explanation is omitted. The production method of this embodiment will be explained together with the operation of the production apparatus. The magnetic recording medium 30a in the state before the formation of the protective layer 4 is supplied from the supply roller 31 and fed in close contact with the pass roller 32 and the thermal roller 50. When the magnetic recording medium 30a reaches the thermal roller 50, the temperature of the magnetic recording medium 30a increases, and foreign matter including water deposited in the atmosphere is discharged as gas in the vacuum atmosphere. The magnetic recording medium 30a is fed to an area where the protective layer 4 is formed in a state in which the surface of the medium 30a is clean. In the same way as in the first embodiment, plasma ion current is generated and reaches the ferromagnetic metallic film layer 2, the protective layer 4 being formed. In this case, since the magnetic recording medium 30 is heated from its reverse side, foreign matter on the surface as well as in the direction of the depth are discharged, and the deposition force is further improved. In particular, greatly improved corrosion resistance is provided. Next, the advantages of the above-mentioned embodiment will be explained with reference to FIGS. 3 and 4. FIGS. 3 and 4 both show still durability and resistance to corrosion of the magnetic recording media 10, 30 in the use of a video tape recorder in which a diamond-like carbon film having a thickness of about 100Å is provided as the protective layer 4 and a stearic acid film of about 30Å thickness is provided as the lubrication layer 5. As conditions for measuring still life, the magnetic recording media 10, 30, 8 mm wide, are made to run at a speed of about 14 mm/sec. Video signals were recorded by a rotary cylinder-type video tape recorder in which two pairs of heads having projection of about 30 $\mu$m with a magnetic head rotated at a relative speed of 3.8 m/sec and a track pitch of about 20 $\mu$m. A load about three times the tension at normal running time was loaded and measured. The life was decided at the time when defects enter in the ferromagnetic metallic film layer 2 of the magnetic recording media 10, 30, and no output was obtained. The resistance to corrosion was measured in such conditions that the magnetic recording media 10, 30 which were recorded by the same video tape recorder as at still life measurement was allowed to stay in an environment of 40° C. 90% as they are and the still durability was measured at a two-times load every week. From FIG. 3, it was confirmed that the initial still durability in the first and second embodiments is two times that produced by the conventional method and clears the requirements of the practical limit of use with sufficiently large values of margin. The magnetic recording medium produced by the first embodiment have a remarkably lengthened initial still life, since foreign matter on the surface of the ferromagnetic metallic film layer 2 is selectively removed. From FIG. 4, it is understood that the resistance to corrosion lasts more than four weeks and more than 60 min. at a two-times load, and it is possible to store magnetic recording media four times that produced by the conventional method. The magnetic recording medium produced by the method of the second embodiment has a remarkably improved resistance to corrosion, since gas is discharged from the surface and the depth direction a ferromagnetic metallic film layer and from a substrate, and it is considered that foreign matter is discharged little from the direction of the depth and the substrate while it is allowed to stay at 40° C. 90%. A case where no pretreatment of Ar glow discharge is performed is shown in FIGS. 3 and 4 as the conventional example (2). It is known from these figures that the still durability is improved over the conventional example (1) in which an Ar glow discharge process is performed, but the resistance to corrosion tends to decrease. In the first embodiment, a case where a gas driving-off apparatus and a plasma CVD apparatus are disposed at a position corresponding to one roller was explained. However, the same results were obtained for a case where no roller was used and two rollers were used. In the second embodiment, a case where a plasma CVD apparatus was disposed at a position corresponding to one thermal roller and one roller was explained. However, when a plurality of thermal rollers are used, resistance to corrosion is further improved, and when a plasma CVD apparatus is disposed at a position at which no roller exists, the same results are obtained. A roller should preferably be used, because defects due to heat are eliminated because of the close contact with the roller, particularly, occurrence of cracks in a metallic film medium can be prevented.

As has been described, above according to the present invention, after a metallic film of a magnetic recording medium is formed, a protective layer is formed immediately after gas on a ferromagnetic metallic film is driven off. As a result, foreign matter on the ferromagnetic metallic film layer and within this layer is removed. A strong bonding between a protective layer and a metallic film layer is effected. Still durability and resistance to corrosion of a video tape recorder are improved. A magnetic recording medium which can be put to practical use can be obtained.

Many widely different embodiments of the present invention can be made without departing from the spirit and scope thereof, therefore it is to be understood that this invention is not limited to the specific embodiments thereof except as defined in the appended claims.

We claim:

1. A method of producing a magnetic recording medium, comprising the steps of: (a) supporting in a vacuum a magnetic recording medium on a roller, said magnetic recording medium being produced by forming a ferromagnetic metallic film layer on a non-magnetic substrate, (b) heating said magnetic recording medium while it is on said roller, and (c) immediately after step (b), forming a protective layer on said magnetic recording medium by a plasma chemical vapor deposition method, said protective layer being formed of a diamond-like carbon film.

2. A method according to claim 1, wherein heating is performed using a halogen lamp or an infra-red ray heater as a heat source for said heating.

3. A method according to claim 2, further comprising forming said light beams generated by said halogen lamp or said infra-red heater into parallel light beams which radiate upon said magnetic recording medium.

4. A method according to claim 1, wherein heating is performed using one or a plurality of thermal rollers for a heat source for said heating.

5. A method according to claim 1, further comprising controlling a tension of said magnetic recording medium so as to be 0.5 kgf per 500 mm width of said magnetic recording medium.

6. A method according to claim 1, further comprising rotating said roller to feed said magnetic recording medium at a constant velocity of 0.1 to 200 meters per minute.

7. A method according to claim 1, wherein the protective layer has a thickness of about 100Å.

8. A method according to claim 1, further comprising forming, prior to step (a), on said substrate a back coating layer that is a mixture of resin and carbon.

9. A method according to claim 1, further comprising forming a lubricant layer on the protective layer, said lubricant layer having a thickness of abut 30Å.

10. A method according to claim 1, wherein heat generated by said heating step (b) does not interfere with said step (c) involving forming a film by a plasma vapor deposition method.

11. A method according to claim 1, further comprising, prior to step (a), providing a dielectric film on at least a surface of said roller for supporting an area on said recording medium on which said protecting layer is formed in step (c), and applying a voltage between said roller and said ferromagnetic metallic film layer.

12. A method according to claim 1, wherein said ferromagnetic metallic film layer is formed of a Co-Ni alloy.

* * * * *